US006612557B2

(12) United States Patent
Sawdon et al.

(10) Patent No.: US 6,612,557 B2
(45) Date of Patent: Sep. 2, 2003

(54) ADJUSTABLE STROKE CLAMP

(75) Inventors: Edwin G. Sawdon, St. Clair, MI (US); Dean J. Kruger, Jeddo, MI (US); Stephen E. Sawdon, Marysville, MI (US)

(73) Assignee: BTM Corporation, Marysville, MI (US)

( * ) Notice: Subject to any disclaimer, the term of this patent is extended or adjusted under 35 U.S.C. 154(b) by 140 days.

(21) Appl. No.: 09/845,822

(22) Filed: Apr. 30, 2001

(65) Prior Publication Data

US 2002/0158394 A1 Oct. 31, 2002

(51) Int. Cl.[7] .......... B23Q 3/08

(52) U.S. Cl. .......... 269/32; 269/228; 269/24; 269/27

(58) Field of Search .......... 269/32, 24, 27, 269/228, 20, 30, 237; 91/399–401

(56) References Cited

U.S. PATENT DOCUMENTS

| | | | | | |
|---|---|---|---|---|---|
| 1,523,565 | A | | 9/1925 | Polymatic | |
| 3,724,837 | A | | 4/1973 | McPherson | |
| 4,164,344 | A | | 8/1979 | Deragne | |
| 4,240,620 | A | | 12/1980 | Tunkers | |
| 4,458,710 | A | * | 7/1984 | Weaver | 137/79 |
| 4,458,889 | A | | 7/1984 | McPherson et al. | |
| 4,723,767 | A | | 2/1988 | McPherson et al. | |
| 4,729,588 | A | | 3/1988 | Kratzer | |
| 4,892,344 | A | | 1/1990 | Takada et al. | |
| 4,905,973 | A | | 3/1990 | Blatt | |
| 5,059,089 | A | | 10/1991 | Kocaoglan | |
| 5,108,079 | A | | 4/1992 | Yonezawa et al. | |
| 5,165,670 | A | | 11/1992 | Sawdon | |
| 5,190,334 | A | | 3/1993 | Sawdon | |
| 5,634,629 | A | | 6/1997 | Blatt | |
| 5,704,600 | A | * | 1/1998 | Robinson | 269/32 |
| 5,853,211 | A | | 12/1998 | Sawdon et al. | |
| 5,871,250 | A | | 2/1999 | Sawdon | |
| 5,884,903 | A | * | 3/1999 | Sawdon | 269/32 |
| 6,199,847 | B1 | * | 3/2001 | Fukui | 269/32 |
| 6,220,588 | B1 | * | 4/2001 | Tunkers | 269/32 |
| 6,416,045 | B1 | | 7/2002 | Morroney | |
| 6,439,560 | B2 | * | 8/2002 | Sawada et al. | 269/32 |

OTHER PUBLICATIONS

U.S. patent application Ser. No. 09/426,623, Sawdon et al., filed Oct. 26, 1999.

Norgren "GC3 Grippers", GC Series Grippers, one page. (Believed to have been offered for sale, publically used or published before Apr. 30, 2001).*

Pictures of Tunkers Adjustable Stroke Clamp, pp. 1–12. (Believed to have been offered for sale, publically used or published before Apr. 30, 2001).*

Brochure of Bimba, (prior to Oct. 26, 1999).*

* cited by examiner

*Primary Examiner*—Lee D. Wilson
(74) *Attorney, Agent, or Firm*—Harness, Dickey & Pierce, P.L.C.

(57) ABSTRACT

An apparatus to position or clamp a work piece includes a body, a generally linearly moving powered actuator positioned in the body, and a mechanism to adjust an available stroke of the actuator. The actuator has a first piston coupled to a second piston. The available stroke is defined by a distance spanned by the first and second pistons.

47 Claims, 7 Drawing Sheets

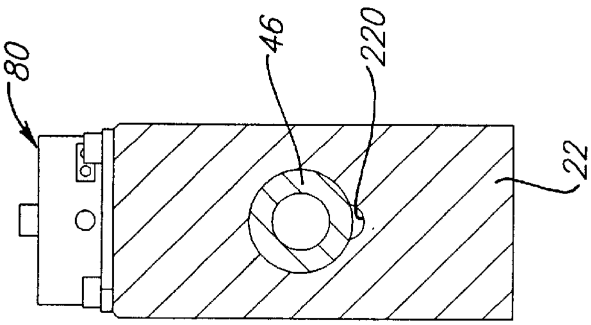
FIG. 10
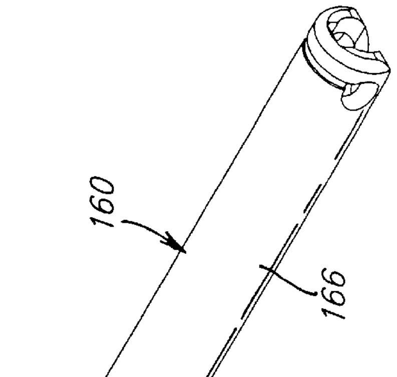
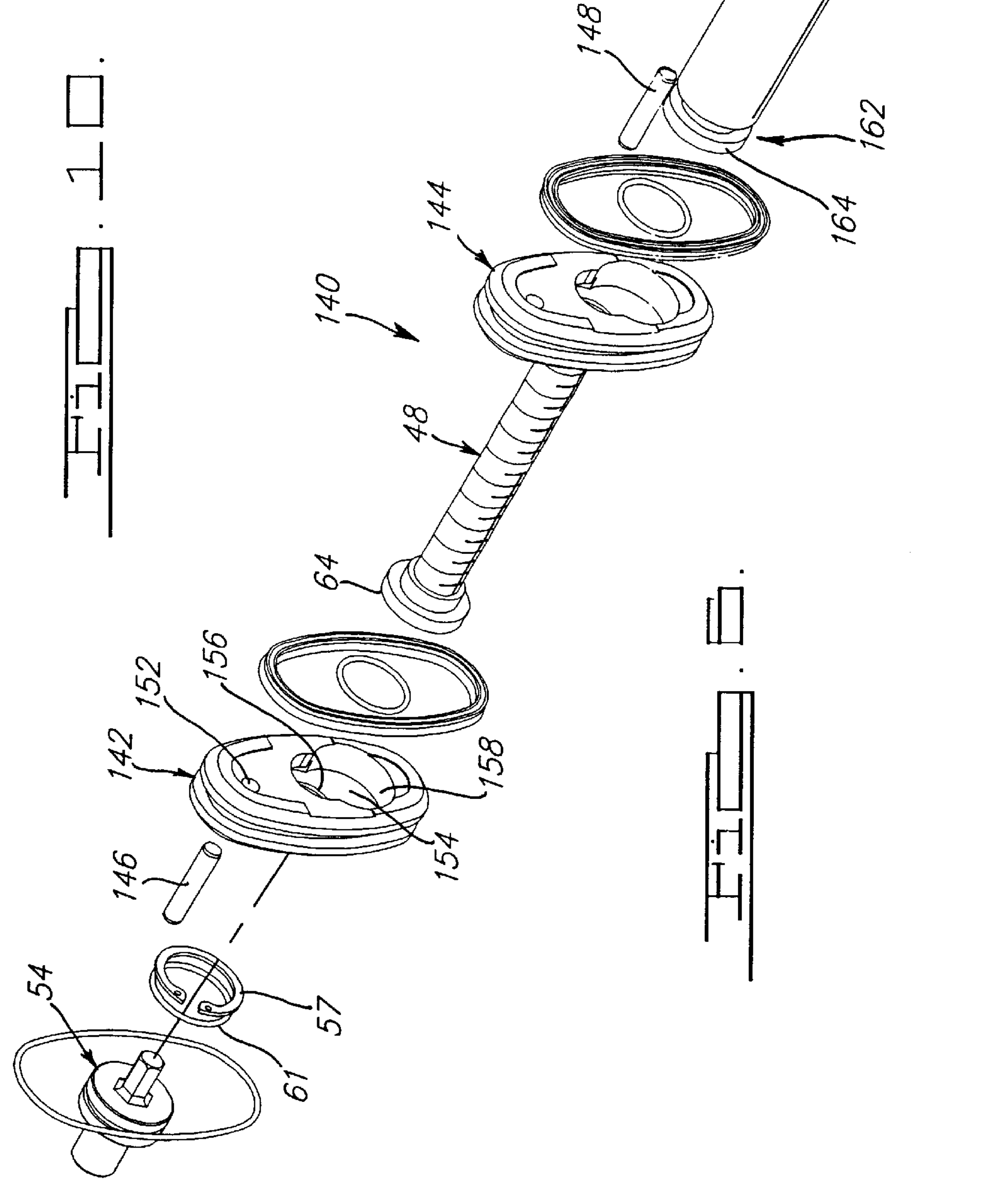
FIG. 9

ADJUSTABLE STROKE CLAMP

BACKGROUND AND SUMMARY OF THE INVENTION

The present invention relates generally to clamping and positioning devices and, more particularly, to a powered clamp or positioning mechanism having an adjustable stroke.

Powered clamps are commonly used in industrial applications for holding work pieces of many sizes and shapes during forming and machining operations. Such devices include a pneumatically or hydraulically actuated cylinder which causes one or more arms to move through a desired range of rotational motion to push against a work piece. Depending on the specific application, the user may wish to actuate one or two arms which may be vertically or horizontally aligned in an environment contaminated with weld splatter, saw chips, coolants, dust and dirt. Two such conventionally powered clamps are disclosed in U.S. Pat. No. 5,171,001 entitled "Sealed Power Clamp" and U.S. Pat. No. 5,884,903 entitled "Powered Clamp and Gauging Apparatus", both of which are hereby incorporated by reference.

When operating a powered clamp or positioning mechanism, it is often desirable to limit the range of motion of the cylinder within a certain operating window.

Various traditionally powered clamps have been modified to provide a method of adjusting the cylinder stroke of the clamp. The most common device includes a screw threadingly engaged with the rear end cap extending into the piston cylinder. The screw position may be adjusted by rotating the screw thereby adjusting the position of a stop for the piston. Unfortunately, several components must be either moved or temporarily removed to perform the adjustment process. Specifically, the proximity sensors must be moved after each adjustment. In addition, several tools are required to complete these steps. The adjustment screws used within the clamp are very long if a full range of stroke is to be accommodated. An increased length of adjustment screw increases the overall lengths of the cylinder which also increases the likelihood of interference and damage to the adjustment screw and piston. Such elongated cylinders also undesirably require extra space in the end use manufacturing plant. If the adjustment screw is shortened, the stroke is correspondingly shortened thereby increasing the number of cylinder models required to provide a certain stroke range.

In accordance with the teachings of the present invention, a preferred embodiment of an adjustable stroke clamp includes a first piston and a second piston interconnected by a threaded fastener arrangement such that the position of the first piston may be adjusted and maintained relative to the position of the second piston. Accordingly, because the length of a piston cylinder is fixed, the stroke of a piston rod may be adjusted by adjusting the relative distance between the two pistons.

Another aspect of the present invention includes an apparatus to position or clamp a work piece having a body, a generally linearly moving powered actuator positioned in the body, and a mechanism to adjust an available stroke of the actuator. The actuator has a first piston coupled to a second piston. The available stroke is defined by a distance spanned by the first and second pistons.

The adjustable stroke clamp and positioning apparatus of the present invention is highly advantageous over conventional clamps because the present invention includes a floating driver to engage the head of a threaded rod. The piston rod, which is internally threaded in combination with the floating driver, allows stroke adjustment with a single allen wrench. In addition, no disassembly whatsoever is required to adjust the stroke of the clamp. Because clamps are often used in highly contaminated environments, it is highly desirable to be able to adjust the stroke of the cylinder without disassembling it.

Another advantage of the present invention is that the pistons themselves carry probe or sensor pins which cooperate with proximity sensors for indicating the position of the pistons within the cylinder. Unlike other devices presently available, the present invention does not require a repositioning of the sensors after a stroke adjustment. Also, less air is required to actuate the clamp when the pistons are spaced apart. A cost operational savings may be realized based on the reduced volume of compressed fluid required.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is an exploded perspective view of a first embodiment of an actuator employed in the preferred embodiment of the present invention;

FIG. 6 is an exploded view of a second preferred embodiment of an actuator employed in the present invention clamp;

FIG. 9 is a cross-sectional side view of an alternate embodiment of the present invention clamp; and FIG. 10 is a cross-sectional end view of the alternate embodiment of the present invention shown in FIG. 9.

DETAILED DESCRIPTION OF THE PREFERRED EMBODIMENTS

Figure 1:
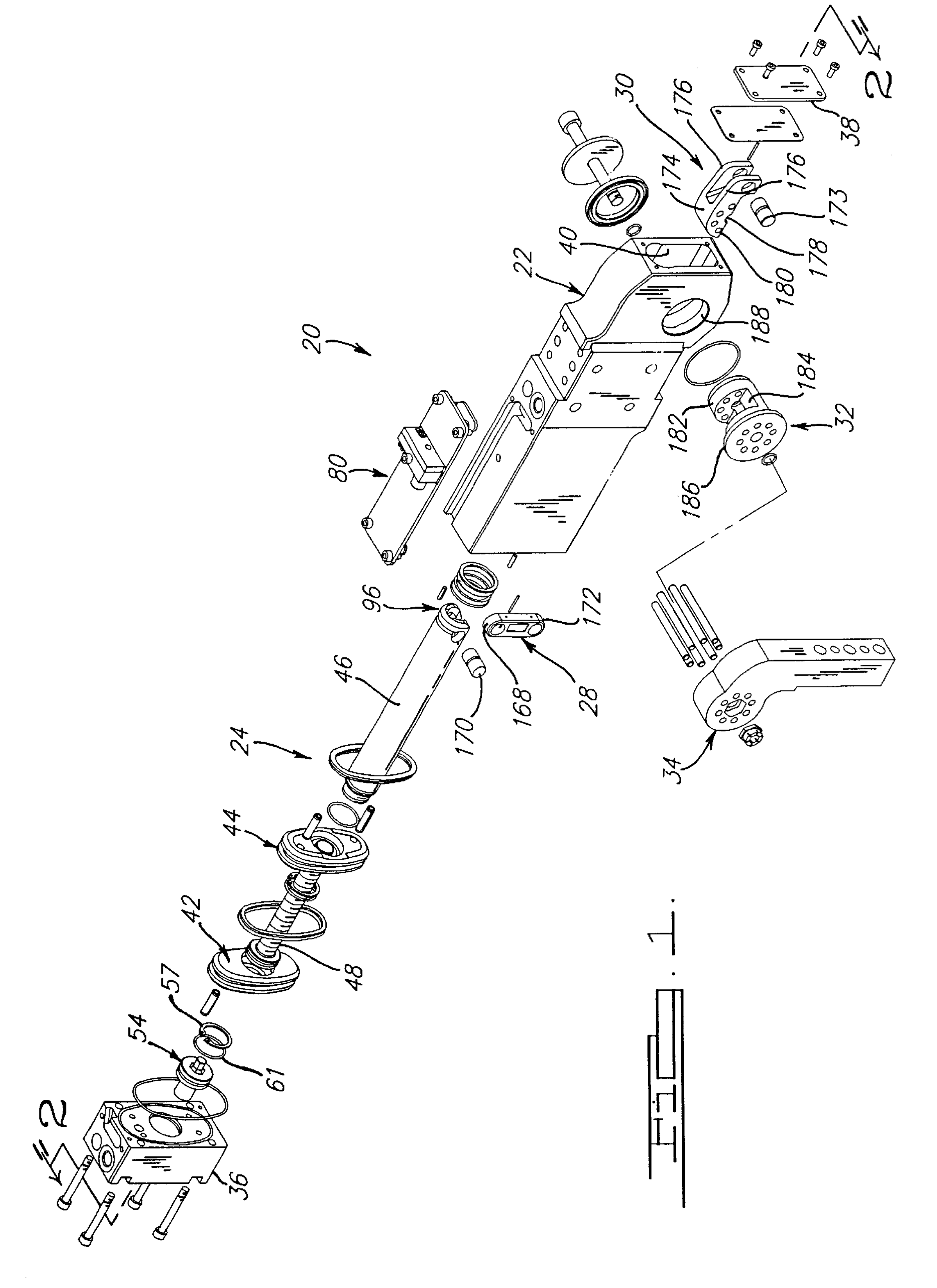
FIG. 1 is an exploded, perspective view showing the preferred embodiment of an adjustable stroke clamp of the present invention.
Figure 2:
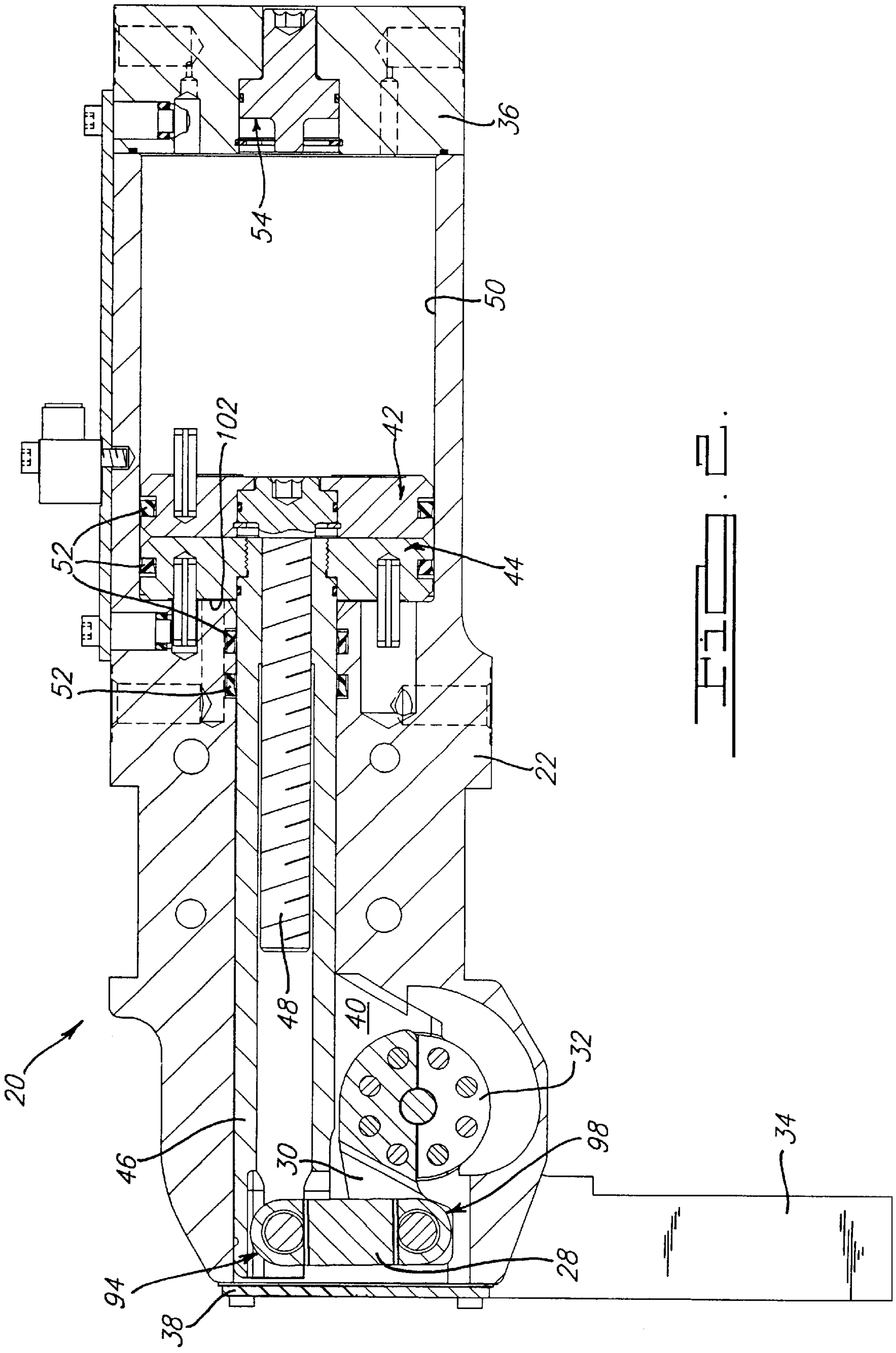
FIG. 2 is a cross-sectional side view, taken along line 2—2 of FIG. 1, showing the preferred embodiment of the present invention.

FIGS. 1 and 2 show a first preferred embodiment of an adjustable clamp and positioning mechanism 20 constructed in accordance with the teachings of the present invention. Adjustable clamp 20 includes a body or housing 22, an actuator 24, a link 28, a crank 30, a hub 32, and an arm 34.

Arm 34 is located external to body 22 while the other aforementioned components are internally disposed within the body. Arm 34 may be reversed to attach to a face of hub 32 on either side of body 22. Alternatively, a pair of arms may be coupled to both faces of hub 32.

Body 22 is preferably forged or extruded from 6061-T6 aluminum and then machined as a unitary hollow part. An end cap 36 is fastened upon a proximal end of body 22 while a front cover 38 is threadingly engaged with an open distal end of body 22. Seals and elastomeric O-rings, or the like, are disposed between end cap 36, front cover 38 and body 22. Once each of the internal components of the adjustable clamp have been assembled, a cavity 40 within the distal end of body 22 is filled with lubricant and sealed by front cover 38. Accordingly, the one piece nature of body 22 aids in achieving a fully sealed and permanently lubricated adjustable clamp assembly.

Actuator 24 includes a first piston 42, a second piston 44, an elongated, cylindrical piston rod 46 and a threaded rod 48. First piston 42 and second piston 44 are linearly translatable within a longitudinally oriented cylinder bore 50 machined in body 22. Bore 50 has an oval cross-sectional shape to orient each of the pistons within the bore during actuation. Each of the pistons are displaced in response to, preferably pneumatic or alternately, hydraulic fluid pressures forcing the pistons in either longitudinal direction. Various annular and elastomeric seals 52 are provided between portions of actuator 24 and the coincidental bores within body 22.

Linear translation of actuator 24 is converted to rotational movement of arm 34 through piston rod 46, pivoting link 28, crank 30 and hub 32. The present invention functions to assist a user in setting the total range of hub and arm rotation per actuation. In practice, an operator may adjust the stroke of actuator 24 to obtain the desired range of rotation. One benefit of the present invention is that a stroke adjustment may be made without disassembling adjustable clamp 20 in any manner.

Figure 3:
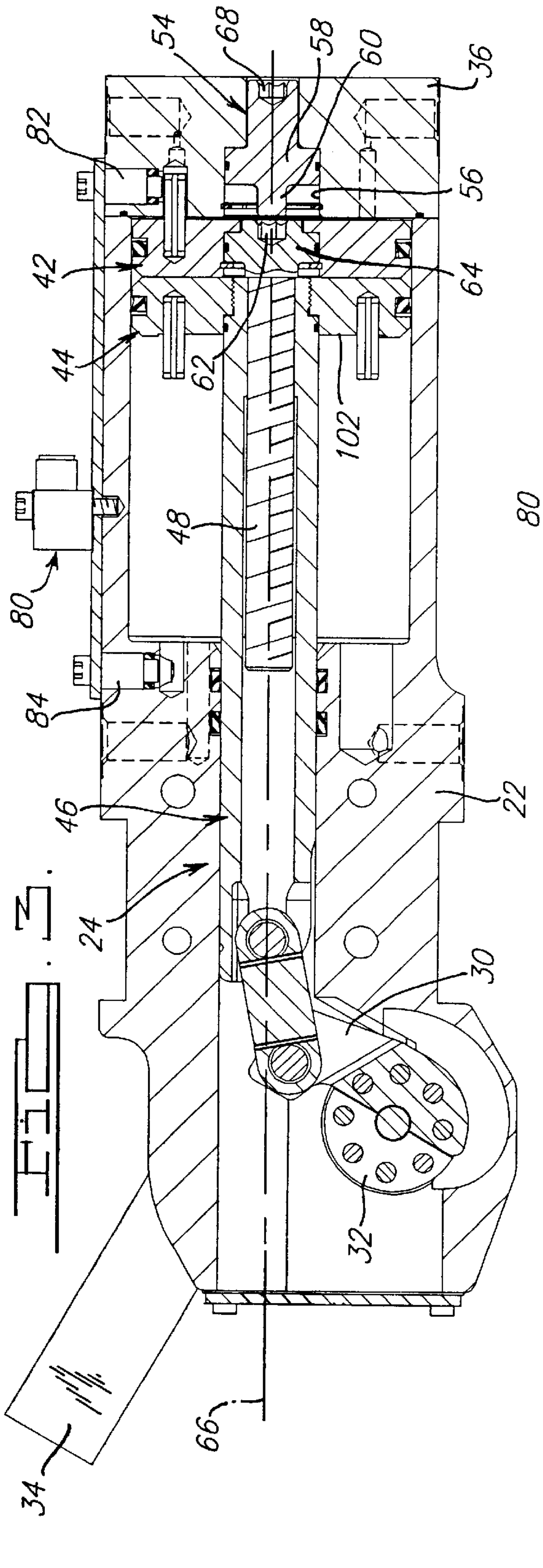
FIG. 3 is a cross-sectional side view, like that of FIG. 2, showing an actuator of the preferred embodiment clamp, located in a fully retracted position.
Figure 4:
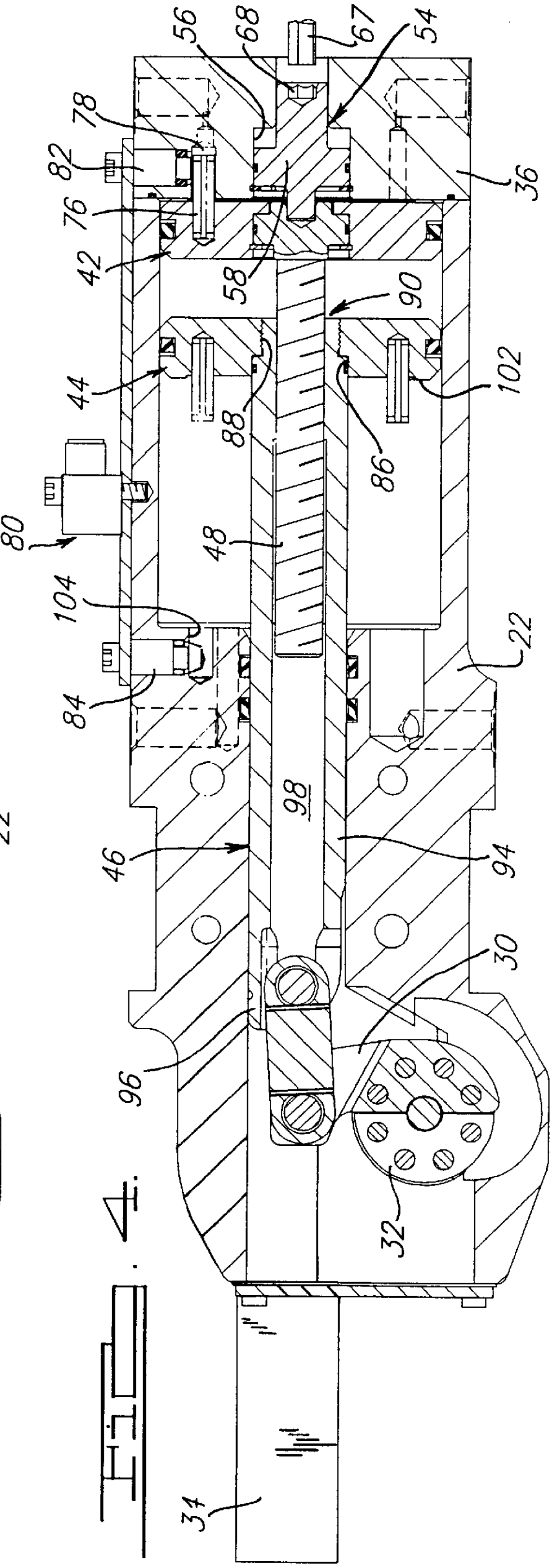
FIG. 4 is a cross-sectional side view showing a first piston spaced apart from a second piston of an actuator employed in the preferred embodiment of the present invention clamp.
Figure 4:
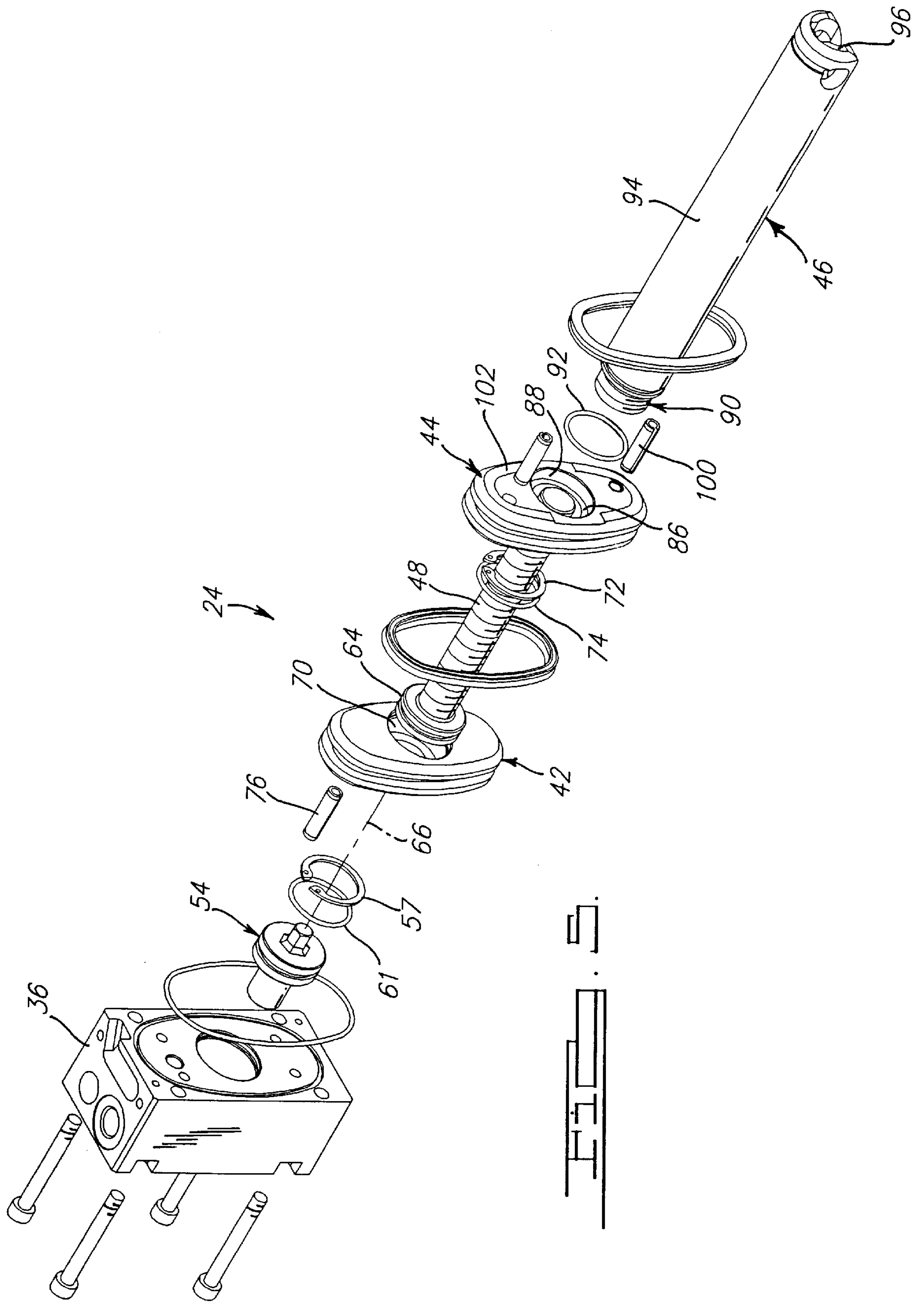

As shown in FIGS. 3 and 4, adjustment is accomplished through the use of a driver 54 disposed within an aperture 56 of end cap 36. Driver 54 is retained in aperture 56 by a snap ring 57. Driver 54 includes a body portion 58 and a protruding shank portion 60. An O-ring 61 is positioned between body portion 58 and aperture 56 to provide a seal for driver 54. Shank portion 60 has a hexagonal cross-section for removable engagement with a recessed socket 62 located in a head 64 of threaded rod 48. Socket 62 also has a hexagonal cross-sectional shape. It should be appreciated that aperture 56 is sized to allow driver 54 to maintain a complete rotational degree of freedom and a limited translational degree of freedom along an axis 66 extending longitudinally through body 22. In this manner, actuator 24 may be fully retracted as shown in FIG. 3, without concern for alignment between shank portion 60 of driver 54 and socket 62 of threaded rod 48. When an adjustment is desired, an operator simply engages an externally removable allen wrench 67 with a recessed socket 68 found in body portion 58 of driver 54. At this time, driver 54 may be rotated and axially displaced to engage shank portion 60 within socket 62. Because threaded rod 48 is equipped with a right-hand thread, counter-clockwise rotation of driver 54 and threaded rod 48 increases the distance between first piston 42 and second piston 44 thereby reducing the total allowable stroke of actuator 24.

FIG. 5 illustrates actuator 24 in greater detail. A head or collar 64 of threaded rod 48 is disposed within a circular counter-bore 70 and retained therein via a snap ring 72. An O-ring 74 provides a seal between head 64 and counter-bore 70. It should be appreciated that this method of interconnection provides first piston 42 a complete rotational degree of freedom about axis 66.

First piston 42 has a generally oval cross-sectional shape with a first sensor pin 76 which extends toward end cap 36. As best shown in FIG. 4, first sensor pin 76 is movable to a position within a sensor pin receptacle 78 of end cap 36 when actuator 24 is in its fully retracted position. A proximity switch 80 includes a first probe 82 and a second probe 84 for determining the presence of sensor pins within the sensor pin receptacles. An appropriate signal is output from proximity switch 80 if a sensor pin is detected by the first or second probes. It is noteworthy that the sensor pins and switches are automatically adjusted when the piston spacing is adjusted.

Second piston 44 includes a generally oval cross-sectional shape with a circular counter-bore 86 having a threaded portion 88. It should be appreciated that while the first and second pistons of the preferred embodiment are shown having an oval cross-sectional shape, the shape is not critical to the function of adjustment clamp 20. Specifically, it is alternately contemplated that pistons having a circular cross-section be utilized in conjunction with an anti-rotational device.

A proximal end 90 of piston rod 46 includes an external thread for engagement with threaded portion 88. A seal 92 is positioned between counter-bore 86 and piston rod 46 to prevent fluid from passing thereby. In addition, piston rod 46 includes a generally cylindrical mid-section 94 with a bifurcated distal end 96. Mid-section 94 also includes an aperture 98 which is at least partially threaded near proximal end 90 for engagement with threaded rod 48. It should be appreciated that aperture 98 extends at least substantially equal to the length of threaded rod 48 to allow first piston 42 to be positioned adjacent to and in contact with second piston 44, as shown in FIG. 3. Threaded rod 48 is also of sufficient length to maintain threaded engagement with aperture 98 when first piston 42 is spaced apart from second piston 44, a distance approximately equivalent to the length of bore 50. In operation, an anti-rotational compound such as Vibra-tite brand material, is applied between threaded rod 48 and piston rod 46 to maintain the desired distance spanned by pistons 42 and 44.

A pair of second sensor pins 100 extend from second piston 44 toward front cover 38. Because adjustable clamp 20 is capable of fully advancing to a position where actuator 24 is in a self-locking, or "over-center" position, the distance from a stop face 102 of second piston 44 to bifurcated distal end 96 must be closely controlled. Accordingly, when assembling piston rod 46 to second piston 44, an operator threadingly engages piston rod 46 with threaded portion 88 until the piston rod bottoms within counter-bore 86. Second piston 44 is backed off from the seated position previously described a minimal amount to align one of second sensor pins 100 with a sensor pin receptacle 104 (see FIG. 4). Because second piston 44 includes two second sensor pins 100, alignment may be achieved by rotating the second piston relative to the piston rod a maximum of 180 degrees. If only one second sensor pin were provided, second piston 44 may require rotation of nearly one full turn or 360 degrees relative to piston rod 46 to achieve proper alignment. A variance of one full turn or one full thread pitch in overall length of actuator 24 is undesirable and therefore avoided by the use of two second sensor pins 100. Additionally, by using this method of attachment, second piston 44 is able to rotate or "float" a small amount relative to bore 50 and piston rod 46. The floating type connection allows each of the pistons to move slightly within bore 50 to provide an optimized seal with minimal wear.

Figure 7:
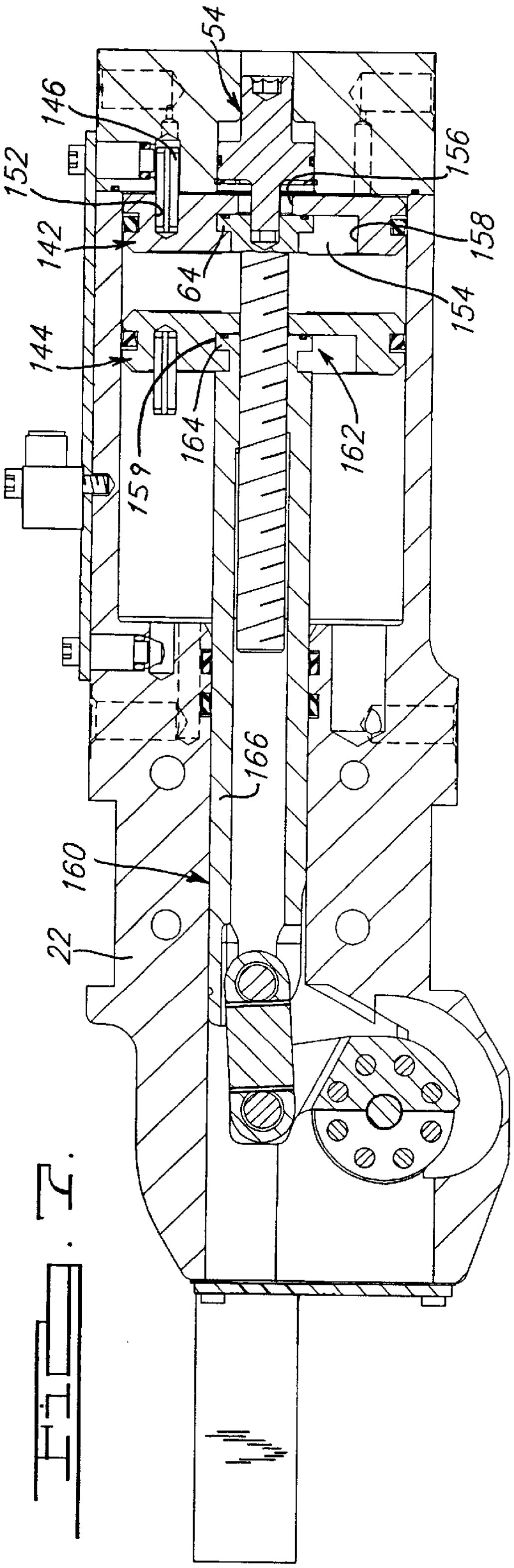
FIG. 7 is a cross-sectional side view showing the second preferred embodiment actuator of the present invention clamp.

With reference to FIGS. 6 and 7, a second preferred embodiment of the clamp employs a varied actuator 140. A first piston 142 is identical to a second piston 144 with the exception that first piston 142 includes a first sensor pin 146 which extends toward end cap 36 while second piston 144 includes a second sensor pin 148 which extends toward front cover 38. Accordingly, only first piston 142 will be described in greater detail.

First piston 142 has a generally oval shape with a first aperture 152 for receipt of first sensor pin 146 and a second aperture 154 for receipt of threaded rod 48. Second aperture 154 includes a through bore portion 156 and a key hole slot 158 partially extending through first piston 142. A detent 159 transversely extends through a portion of first piston 142. Threaded rod 48 is coupled to first piston 142 by displacing collar 64 within the key hole slot 158 and translating threaded rod 48 into detent 159 until the longitudinal axis of the threaded rod aligns with through bore portion 156. Detent 159 is sized to receive collar 64 and resist axial displacement of threaded rod 48 once the above-described component alignment occurs.

Piston rod 160 includes a proximal end 162 having a collar 164 similarly coupled to second piston 144. In addition, piston rod 160 has a generally cylindrical body 166 with a bifurcated distal end and aperture substantially identical to piston rod 46 of first embodiment actuator 24.

The remaining description is applicable to adjustable clamps incorporating either the first or second embodiment actuator. For purposes of clarity, an adjustable stroke clamp equipped with first embodiment actuator 24 will be described.

Figure 8:
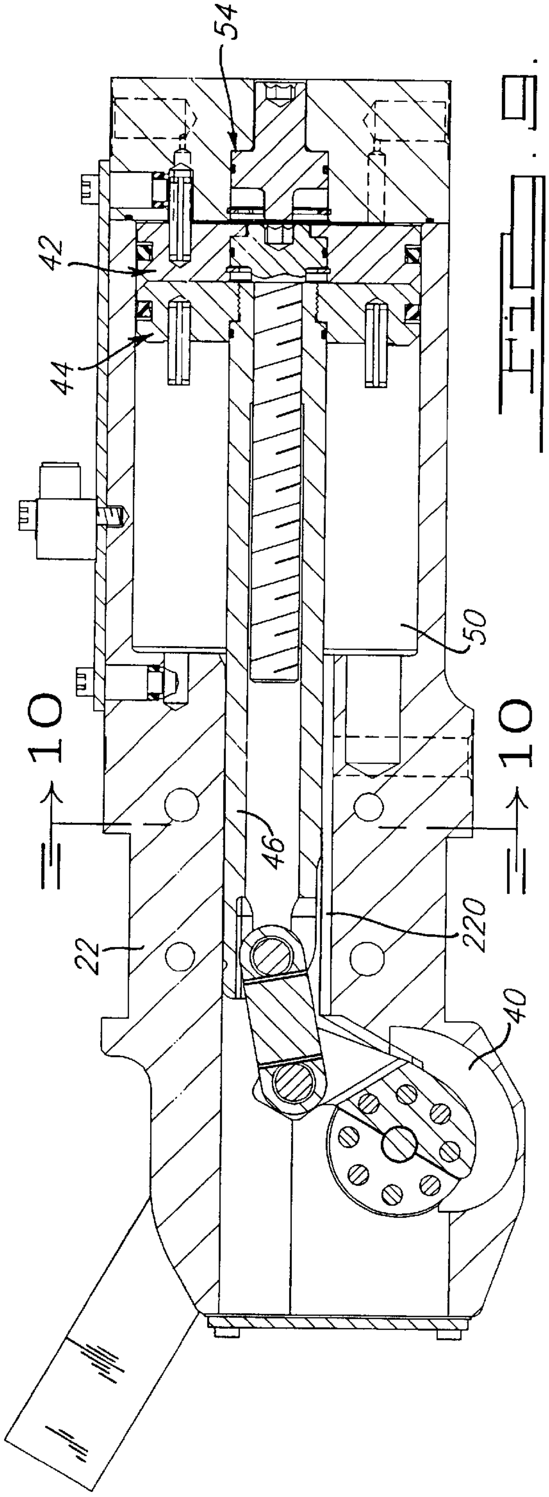
FIG. 8 is a partial exploded side view of the preferred embodiment of the present invention clamp.
Figure 7:
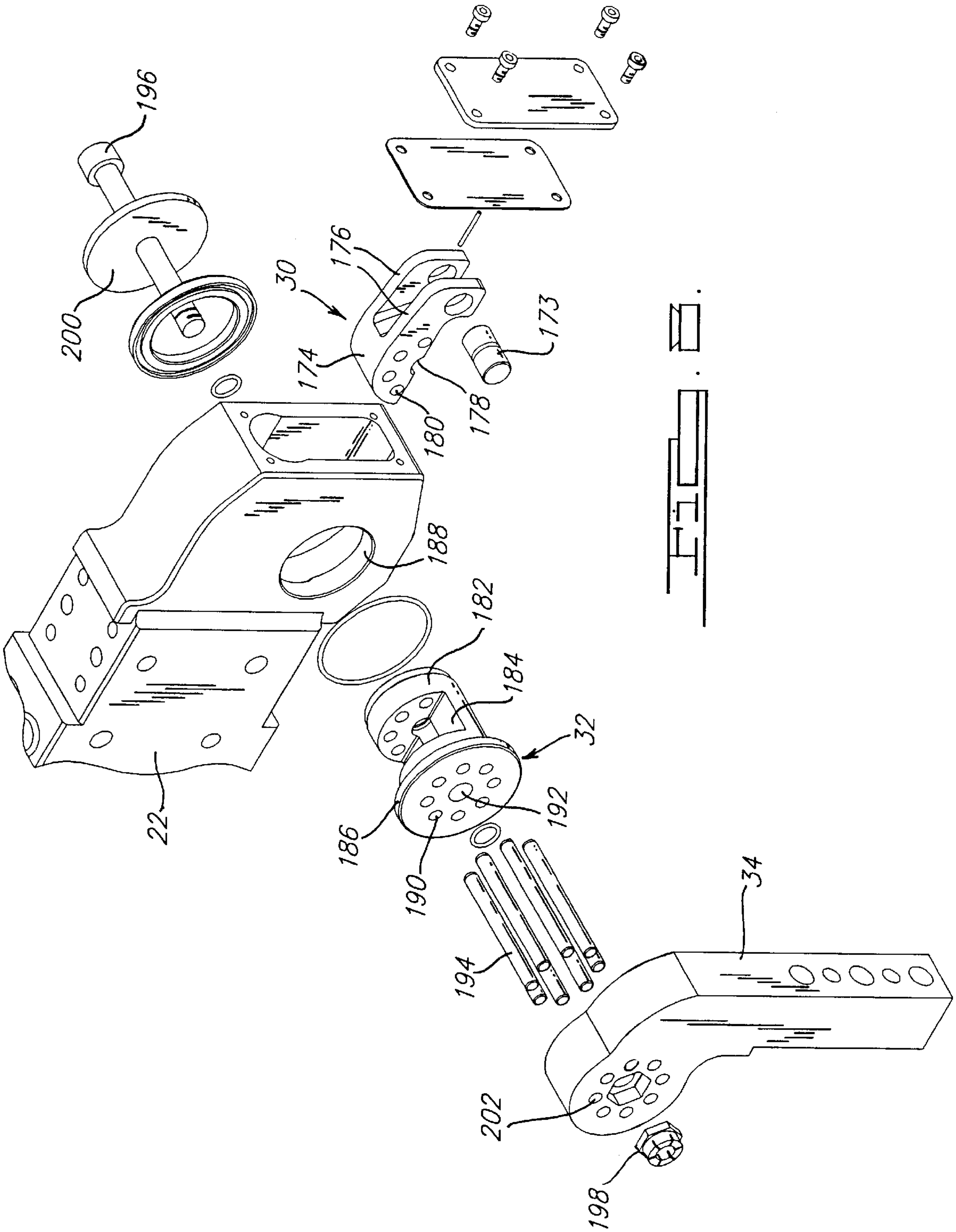

With reference to FIGS. 1 and 8, bifurcated distal end 96 of piston rod 46 is coupled to a first end 168 of link 28 via a pin 170. A second end 172 of link 28 is coupled to crank 30 by way of another pin 173.

Crank 30 includes a seat 174 from which a pair of parallel walls 176 extend in a bifurcated manner. A semi-circular recess 178 is positioned along one edge of each of walls 176. In addition, four orifices 180 transversely extend through seat 174 and are arranged in a generally semi-circular pattern in relation to each other and semi-circular recess 178. Crank 30 is preferably machined from 6150 HRS material which is hardened and ground to Rc 50–54.

Hub 32 has a cylindrically-shaped peripheral surface 182 partially split by a laterally extending channel 184. Hub 32 further includes an annular flange 186 outwardly projecting from an outboard face. Peripheral surface 182 of hub 32 is rotatably received within a matching cross-bore 188 extending through side walls of body 22. Eight circularly oriented apertures 190 are drilled through both faces of hub 32 and the portion of hub 32 adjacent to channel 184. A central aperture 192 is also drilled through hub 32. Hub 32 is preferably machined from 4150 HT material.

Arm 34 is affixed to a face of hub 32 via eight dowel pins 194 and a screw 196. Screw 196 engages a locking nut 198 and sandwiches a hubcap 200 on its opposite end. Semi-circular recess 178 of crank 30 is designed to provide clearance around the shaft of screw 196. Arm 34 includes a set of apertures 202 arranged in a generally circular pattern with respect to each other. Dowel pins 194 are positioned within apertures 202 and arm 34 is placed in a pre-selected orientation in relation to hub 32 and body 22. Four dowel pins 194 also retain hub 32 to crank 30. Hub 32 is preferably constructed from 1045 material.

An operational sequence may be observed with reference to FIGS. 2–4. Specifically, with reference to FIG. 2, arm 34 is disposed in a locking position wherein a work piece would be firmly held for a highly repeatable and accurate gauging or clamping function. In this position, actuator 24 is fully extended such that stop face 102 bottoms within bore 50 of body 22. At this time, first end 168 of link 28 is positioned relative to second end 172 in an "over-center" relation. Accordingly, forces exerted on arm 34 in an attempt to rotate hub 32 in a clockwise direction are resisted. In this manner, adjustable clamp 20 maintains the desired position of arm 34 even if a loss of fluid pressure within bore 50 occurs. It should be appreciated that other links which do not obtain an over-center relation may also be used.

FIG. 3 illustrates actuator 24 in a fully retracted position. In this position, first piston 42 is forced into contact with end cap 36. First sensor pin 76 is disposed within sensor pin receptacle 78. Proximity switch 80 outputs an appropriate signal regarding the position of actuator 24. It is at this actuator position where driver 54 may be selectively disposed within socket 62 and rotated to adjust the stroke of actuator 24. A maximum stroke condition is shown in FIG. 3 where first piston 42 is positioned adjacent second piston 44.

With reference to FIG. 4, first piston 42 is spaced apart from second piston 44 to provide a decreased stroke and resultant range of arm articulation. By comparing FIGS. 3 and 4, it can be observed that the initial position of arm 34 is affected by adjustment of actuator 24. The initial or fully retracted arm position varies with actuator adjustment but the final or fully extended position of arm 34 remains constant. This occurs because second piston 44 is coupled to piston rod 46 and piston 44 is free to travel until stop face 102 bottoms in bore 50. Another feature of the present invention relates to the fact that the volume of space within bore 50 located between first piston 42 and second piston 44 is void of pressurized fluid. Therefore, as the total stroke of adjustable clamp 20 is reduced, the volume of fluid required to displace actuator 24 is correspondingly reduced.

An alternate embodiment of adjustable clamp 20 of the present invention is shown in FIGS. 9 and 10. In this exemplary embodiment, body 22 includes a longitudinally extending channel 220 interconnecting bore 50 with cavity 40. The purpose of providing channel 220 is to increase the surface area available for retracting actuator 24 from the fully extended, over center position previously described. By allowing pressurized fluid to enter cavity 40, the cross-sectional area of piston rod 46, or any other member attached to an end of the rod, is added to the area of second piston 44. Therefore, the force available to retract actuator 24 is increased an amount proportionately equivalent to the increase in surface area achieved by adding the area of piston rod 46. Alternately, a longitudinal bore may be located independent of and spaced away from the piston rod bore in a parallel manner.

While various embodiments of the clamp have been disclosed herein, other aspects also fall within the scope of the present invention. For example, other piston-to-arm coupling mechanisms can be employed which use additional links or cams to convert linear to rotary motion. Moreover, the adjustable stroke feature can equally apply to work piece grippers and part locators. Additionally, an actuator may be separately manufactured and subsequently attached to a housing or mechanism for moving objects. The body can also have a circular-cylindrical external shape. Additionally, the threaded adjustment rod can be replaced by another. The external adjustment tool can alternately be a screwdriver and may even be integrally attached to the clamp, although some of the robust and compact advantages of the present invention may not be fully achieved. While various materials have been disclosed, other materials can be employed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for interfacing with a work piece, the apparatus comprising:

a body; and an actuator linearly moveable in relation to said body, said actuator including a first piston adjustably connected to a second piston, said first and second pistons operably advancing and retracting in response to fluid pressure, wherein a range of movement of said actuator is defined by a position of said first piston relative to said second piston.

2. The apparatus of claim 1 further including a hub coupled to said actuator for pivotable movement in response to linear movement of said actuator.

3. The apparatus of claim 2 further including a piston rod and an adjustment rod, said piston rod connecting said second piston and said hub, said adjustment rod connecting said first piston and said piston rod.

4. The apparatus of claim 3 wherein said adjustment rod is threadingly engaged with said piston rod such that rotation of said adjustment rod varies said position of said first piston relative to said second piston.

5. The apparatus of claim 3 further including a link having a first end and a second end, said first end pivotably coupled to said piston rod, said second end being coupled to said hub.

6. The apparatus of claim 2 further including a workpiece interfacing arm coupled to said hub, said arm being held in a locked position when said actuator is full extended.

7. The apparatus of claim 1 further comprising a threaded adjustment rod rotatably coupled to said first piston.

8. The apparatus of claim 7 wherein said adjustment rod is rotatably coupled to said second piston.

9. A apparatus comprising:

a body having a bore;

a first piston slidably moveable in said bore;

a second piston positioned substantially coaxially to said first piston in said bore; and an adjustable mechanism coupling said first piston and said second piston, said adjustment mechanism being operable to position said first piston a spaced distance relative to said second piston to limit piston stroke travel and to change fluid quantity required within the bore.

10. The apparatus of claim 9 wherein said adjustment mechanism includes a first threaded member coupled to said first piston and a second threaded member coupled to said second piston, whereby rotation of one of said first and second threaded members relative to the other varies said spaced distance and said clamp stroke.

11. The apparatus of claim 10 further including a driver rotatably coupled to said body, said driver being selectively engageable with said first threaded member to vary said clamp stroke.

12. The apparatus of claim 11 further including an end cap enclosing said bore, said driver being rotatably mounted to and retractable entirely into said end cap, wherein said driver is accessible from outside enclosed bore.

13. The apparatus of claim 12 wherein said first piston is rotatably coupled to said first threaded member to allow said first piston to rotate when forming a seal with said bore.

14. The apparatus of claim 13 further including a hub rotatably coupled to said body, said hub drivingly engaged by said second threaded member to rotate in response to linear displacement of said second threaded member.

15. The apparatus of claim 9 further including a position sensor to sense the position of said first piston, said position sensor having a sensing end facing in a direction parallel to plane defined by a leading face of said first piston.

16. The apparatus of claim 15 wherein said position sensor outputs a first signal when said first piston is in a predetermined position.

17. The apparatus of claim 16 wherein said position sensor outputs a second signal when said second piston is in a predetermined position.

18. The apparatus of claim 17 wherein said position sensor is operable to output said first and second signals regardless of said spaced distance between said first and second pistons.

19. The apparatus of claim 18 further including a sensor pin protruding in an elongated manner from said first piston, said sensor pin located in sensing proximity to said position sensor when said first piston is at said predetermined position.

20. An apparatus to position or clamp a work piece, the apparatus comprising:

a body;

a generally linearly moving power actuator positioned in said body; and a mechanism operable to adjust an available stroke of said actuator, said actuator having a first piston always coupled to a second piston when the pistons are both advanced, said available stroke being defined by a distance spanned by said first and second pistons.

21. The apparatus of claim 20 wherein said mechanism to adjust said available stroke includes a driver selectively engageable with said actuator to vary said distance spanned by said first and second pistons.

22. The apparatus of claim 21 wherein said driver is accessible from a location outside said body.

23. The apparatus of claim 22 wherein said mechanism to adjust said available stroke includes a first member rotatably coupled to said first piston and a second member rotatably coupled to said second piston, said first member threadingly engaged with said second member whereby rotation of one of said first and second members varies said distance spanned by said first and second pistons.

24. The apparatus of claim 20 wherein pneumatic fluid operably powers said pistons.

25. An apparatus comprising:

a body having a wall;

an actuator slidingly coupled to said body, said actuator being adjustable to define a changeable stroke distance, said actuator operable traveling relative to said body; and a driver rotatable coupled to said body, at least a majority of said driver being substantially located within said wall of said body, said driver being selectively engageable with said actuator to adjust said stroke distance.

26. The apparatus of claim 25 wherein said actuator includes a first piston movably coupled to a second piston, and wherein said stroke distance is defined by a distance spanned by said first piston and second pistons.

27. The apparatus of claim 26 wherein said actuator includes a threaded member coupled to one of said first and second pistons, wherein rotation of said threaded member adjusts said stroke and the pistons always move together.

28. The apparatus of claim 27 wherein said driver is selectively engageable with said threaded member to vary said distance spanned by said first and second pistons.

29. The apparatus of claim 25 wherein said well of said body is an end cap that is removable from the remainder of said body.

30. A work piece engaging apparatus comprising:

a piston having an axially extending aperture with a transversely extending detent formed therein;

a rod having an annular collar positionable in said detent to interconnect said piston and said rod; and a workpiece engagable member coupled to and operably moving in response to operable movement of said rod.

31. The apparatus of claim 30 further comprising a seal located around an entire periphery of said piston, wherein said aperture is shaped as a key hole inwardly spaced away from said seal.

32. The apparatus of claim 31 wherein said rod is rotatably coupled to said piston.

33. The apparatus of claim 30 wherein said rod is attached to said piston by axially displacing said collar in said axially extending aperture and transversely displacing said collar in said transversely extending detent.

34. The apparatus of claim 9 wherein the pistons advance and retract together.

35. The apparatus of claim 30 wherein said rod is coaxial with said piston.

36. The apparatus of claim 30 further comprising a link at least partially coupling said rod to said workpiece engagable member, the workpiece engagable member being a rotatable clamping arm.

37. An apparatus comprising:

a body;

a first piston slidably moveable in said body;

a second piston slidably moveable in said body;

a threaded member having a socket, said threaded member coupling said first piston to said second piston, wherein said threaded member is operable to vary a distance between said first and second pistons to limit piston stroke travel; and a driver rotatably coupled to said body, said driver including a protruding shank selectively engageable with said socket of said threaded member wherein said threaded member rotates in response to rotation of said driver when said driver is in the engaged position.

38. The apparatus of claim 37 wherein said driver includes a socket engageable by a tool located outside said body and wherein said driver rotates in response to rotation of said tool.

39. The apparatus of claim 38 wherein said tool is engageable with said socket of said driver without any disassembly of said apparatus.

40. The apparatus of claim 39 further including a proximity sensor for sensing the location of at least one of said first and second pistons, said proximity sensor operable to sense piston position while mounted at a single location relative to said body regardless of said distance between said first and second pistons.

41. A method of adjusting a stroke of an apparatus having a body with a tool, the apparatus having a first piston adjustably coupled to a second piston, the first and second pistons slidably moveable in the body the method comprising:

(a) engaging an adjustment mechanism with the tool external to said body;

(b) rotating the tool;

(c) adjustably moving the first piton relative to the second piston; and (d) simultaneously moving the first and second pistons when applying sufficient fluid pressure.

42. The method of claim 41 wherein the step of engaging said adjustment mechanism includes a rotating threaded member coupled to one of said first and second pistons wherein rotation of said threaded member varies a distance spanned by the first and second pistons.

43. The method of claim 42 wherein said adjustment mechanism includes a driver spaced apart from said threaded member and wherein the step of engaging said adjustment mechanism with the tool includes engaging a driver with the tool and displacing said driver into engagement with said threaded member.

44. The method of claim 41 further comprising changing fluid volume required in a cylinder of the body by adjustably moving the first piston relative to the second piston.

45. A work piece engaging apparatus comprising:

a body having a first cavity and a second cavity;

a piston slidably moveable within said first cavity, a rod having a first end slidably moveable within said first cavity and a second end slidably moveable within said second cavity wherein said first end of said rod is coupled to said piston; and a passageway extending through said body interconnecting said first cavity and said cavity to allow a pressurized fluid to substantially act on said piston and at least one of said first and second ends of said rod substantially simultaneously.

46. The apparatus of claim 45 wherein said actuator includes a second piston slidably moveable within said first cavity.

47. The apparatus of claim 45 wherein said body includes a piston rod bore and wherein said passageway is a longitudinally extending channel in communication with said piston rod bore substantially along its entire length.

* * * * *

UNITED STATES PATENT AND TRADEMARK OFFICE

CERTIFICATE OF CORRECTION

PATENT NO. : 6,612,557 B2 
DATED : September 2, 2003
INVENTOR(S) : Edwin G. Sawdon, Dean J. Kruger and Stephen E. Sawdon It is certified that error appears in the above-identified patent and that said Letters Patent is hereby corrected as shown below:

Title page,
Item [56], References Cited, U.S. PATENT DOCUMENTS, delete "1,523,565 A 9/1925 Polymatic".
FOREIGN PATENT DOCUMENTS, insert -- GB 1,523,565 A 1/1925 --.

Column 7,
Line 45, "A" should be -- An --.
Line 50, "adjustable" should be -- adjustment --.

Column 8,
Line 2, after "outside" insert -- said --.
Line 12, after "to" insert -- a --.
Line 32, "power" should be -- powered --.
Line 58, "operable" should be -- operably --.
Line 60. "rotatable" should be -- rotatably --.

Column 9,
Line 8, "well" should be -- wall --.

Column 10,
Line 11, after "body" insert -- , --.
Line 17, "piton" should be -- piston --.
Line 45, after "said" (second occurrence) insert -- second --.

Signed and Sealed this

Second Day of March, 2004

JON W. DUDAS
*Acting Director of the United States Patent and Trademark Office*